United States Patent [19]

Morel et al.

[11] Patent Number: 5,572,731

[45] Date of Patent: * Nov. 5, 1996

[54] SEQUENTIALLY NAVIGATED OBJECT ORIENTED COMPUTER SYSTEM

[75] Inventors: William P. Morel, Redmond, Wash.; Christopher Robson, Corvallis, Oreg.; Hugh Duggan, Bristol, England

[73] Assignee: Hewlett-Packard Company, Palo Alto, Calif.

[ * ] Notice: The portion of the term of this patent subsequent to Dec. 30, 2012, has been disclaimed.

[21] Appl. No.: 84,407

[22] Filed: Jun. 29, 1993

Related U.S. Application Data

[63] Continuation-in-part of Ser. No. 778,836, Dec. 30, 1992, abandoned.

[51] Int. Cl.⁶ .................................................... G06F 9/44
[52] U.S. Cl. .......................... 395/701; 395/501; 395/340
[58] Field of Search ................................. 395/153, 157, 395/158, 159, 650, 700

[56] References Cited

U.S. PATENT DOCUMENTS

| | | | |
|---|---|---|---|
| 4,974,173 | 11/1990 | Stefik et al. | 395/153 |
| 5,008,853 | 4/1991 | Bly et al. | 364/900 |
| 5,057,996 | 10/1991 | Cutler et al. | 395/650 |
| 5,107,443 | 4/1992 | Smith et al. | 395/158 |
| 5,129,083 | 6/1992 | Cutler et al. | 395/600 |
| 5,159,669 | 10/1992 | Trigg et al. | 395/159 |
| 5,220,657 | 6/1993 | Bly et al. | 395/425 |
| 5,233,687 | 8/1993 | Henderson, Jr. et al. | 395/158 |
| 5,280,583 | 1/1994 | Nakayama et al. | 395/153 |

FOREIGN PATENT DOCUMENTS

| | | |
|---|---|---|
| 0413488A2 | 8/1989 | European Pat. Off. . |
| 0535860A2 | 4/1991 | European Pat. Off. . |

OTHER PUBLICATIONS

Snadgress et al., "Temporal Databases", IEEE Computer, Sep. 1986, pp. 35–42.
"Anticipating the ISO File Transfer Standards in an Open Systems Implementation", N. K. Petersen et al, Computer Networks and ISDN Systems, vol. 9, No. 4, Apr. 1985, pp. 267–280.
Proc. from the 2nd Intl. Conf. on Expert Database Systems, "The Design of KIVIEW: An Object–Oriented Browser ," Amihai Motro et al., vol. XIII, Apr. 25, 1988, pp. 107–131.
Proc. From 24th ACM/IEEE Design Automation Conference "An Object–Oriented Approach to Data Management: Why Design Databases Need It," Sandra Heiler et al., 1987, pp. 335–340.
"Views Objects, and Databases," Gio Wiederhold, Computer, vol. 19, No. 12, Dec. 1986, pp. 37–44.

Primary Examiner—Kevin A. Kriess
Assistant Examiner—Dennis M. Butler

[57] ABSTRACT

An object based computer system has viewers which may be directed around the object world of the system between semantic objects. The system includes a sequence object that has a path list specifying a path around a sequence of semantic objects of system. Each viewer can be linked to the sequence object to access the path list held by the latter, thereby enabling the viewer to follow the corresponding sequence of semantic objects, viewing each in turn.

10 Claims, 8 Drawing Sheets

SEQUENTIALLY NAVIGATED OBJECT ORIENTED COMPUTER SYSTEM

The present application is a continuation-in-part of U.S. patent application Ser. No 07/778,836 filed Dec. 30, 1992 now abandoned.

FILED OF THE INVENTION

The invention relates to an object based computer system.

BACKGROUND OF THE INVENTION

Object based computer systems facilitate multitasking and multi-user operations where common data files may be accessed concurrently by different tasks operated from the same terminal or operated by different users employing respective terminals. A windows environment is generally employed in conjunction with an object based system to enable windows to be allocated to respective concurrent tasks. There follows an overview of an object based system in a windows environment which will help define terms used herein.

In its broadest sense, as used herein, the term OBJECT means an individually addressable entity that has associated state information and is capable of receiving and responding to messages sent to it.

Objects are generally implemented as a combination of data and method code which is normally stored on disk. An object may be INACTIVE, when it is identified simply as a disk file, or ACTIVE, when it has a PROCESS, or executable file, associated with it. When active, at least parts of the object are held in the computer RAM and the object is defined by the state of the associated process rather than by its file.

Objects can be LINKED to other objects so that changes in one are reflected in the object or objects with which it is linked by virtue of MESSAGES which are passed between the linked objects. The system is controlled by an OBJECT MANAGER which is an application running in the windows environment and which controls activation and deactivation of objects, and the passage of messages between objects.

An object is sometimes a CONTAINER which contains as notional parts other objects. Examples of container objects in a distributed office system are a desktop, folder and a document. A VARIABLE DIMENSION DATA OBJECT (VDO) is a data store of which the values of elements may be viewed and changed directly by a user.

Object based systems have suffered the disadvantage common to multi-tasking or multi-user systems sharing data files. This is that although, with careful record-locking procedures, different tasks or users can, in concurrent sessions, alter data in the same data file (or object) each alteration and display is effectively carried out independently. The users do not have immediate cross references and updating to changes made to other users to the data file at the same time.

We have devised a solution to this problem which depends on splitting an object between a SEMANTIC part (which defines the state of the object) and a PRESENTATION part (for presenting to a user the state of the object). Indeed, conceptually one can think of there being separate semantic objects and presentation objects. In addition, when using a windows user interface, there are windows for viewing objects and facilitating multi-tasking. In this specification, the presentation part or presentation object is something which is utilised by a window and forms part of the window for the time in which the window is viewing the object in question and generally a distinction between the window and the presentation part or object will not be made.

Semantic objects have data stored in a particular storage domain. A storage domain may be regarded as closely equivalent to a storage medium such as a hard disc or floppy disc in the sense that all objects in a given storage domain are on-line together or are off-line together. Consequently, a single machine may support a plurality of storage domains.

The present invention could be applied in a single computer having one or more storage domains but is primarily concerned with an object based system having a plurality of user stations. Such a system may be provided by a single central processing device having a plurality of user stations coupled to it, or it may be provided by a distributed processing network consisting of a number of independent processing units each having a respective station associated with it. In the system of the present invention an object has an implicit presentation, which will look the same however viewed.

It is possible to open one or more windows on each object. The windows manage the display and input/output (lexical) interaction in the system. The use of multiple windows in conjunction with an object enables employment of the techniques of sharing (multiple windows to a common object) and distributed (window on one machine and object on another) applications.

We define a VIEWER as an object which allows users to access other objects by providing the appearance of the object to the user and accepting user input for data manipulation. Viewers have hitherto been known as TASK WINDOWS, but a window is part only of the viewer. The object being viewed controls its own state and provides the methods for access to and manipulation of that state.

Users have the ability to NAVIGATE their viewers around the object world. In turn, the viewer is linked to different objects so as to allow the user to observe and manipulate the objects. It is important to note the concept of navigation of a viewer in this system. A user does not need to open a new window for each object.

When sharing or multi-user operations are being effected, each task or user associated with a particular object is a REFEREE of that object. It is ensured that each active object retains references to its referees so that they are sent messages to be notified of changes during object processing.

The semantic/presentation split allows multiple viewers to be attached to an object. It is important to remember in this case that all viewers are seeing the same object, not a version of it. This is important, as we have a basically 'physical' model of the object world, when a user manipulates an object he is actually physically changing it for everyone. This could lead to conflict when two or more users are trying to manipulate the same thing. A solution is to provide a presence mechanism whereby referees of an object being viewed are notified of the presence of each other by indications in their respective viewers.

Indication of the presence of concurrent viewers of an object greatly facilitates the user's vision of the system and under-pins the user model which the system establishes. Instead of merely observing the effects of his own manipulations of data the user can be aware that other viewers are present and thus capable of separate manipulation of the same data.

A user always knows what he has requested by way of a manipulation. This is the local feedback provided by the viewer. The underlying object updates all viewers of its state, thus the user will see the end effect. In such conflict conditions it is not possible to guarantee that the request and the end effect match, but the user will not be misled as to what has happened. One of the important benefits of the presence mechanism is to help explain these situations to the user. The semantic/presentation split also allows viewers to be remote (from the object), without the user losing the benefit of immediate feedback of his manipulations.

Users themselves can move from one terminal to another. The identity of the users is preferably obtained from Personal Identity Cards which they use to log on to the system.

As an extension of the presence mechanism there may be provided a coupling facility whereby different viewers may be coupled together in a set so that navigation within the system of one viewer by its user has the effect of passing navigational messages to the other viewer or viewers in the set so that those other positions of the said one viewer. With this coupling facility, a first user can, via his viewer, conduct one or more other viewers around the system for guidance, instruction, or co-operative work.

Although the coupling mechanism may implement only navigational display messages, the principal advantage lies in the application of the navigational message to drive the coupled viewers in company with each other around the system. With such an arrangement, a hierarchy is preferably established, whereby one viewer is the guide and the or each other viewer is a follower.

The present invention employs the navigation facility in order to provide an enhancement to the system.

SUMMARY OF THE INVENTION

According to the invention there is provided an object based computer system comprising at least one computer programmed to support objects, and a plurality of objects associated with said at least one computer, said plurality of objects comprising:

a plurality of semantic objects;

at least one viewer, said at least one viewer being capable of being linked to a said semantic object to allow the latter to be viewed by a referee, and said system allowing said at least one viewer to be navigated around between said semantic objects; and a sequence object comprising navigational path data specifying a particular path that may be taken by a said viewer between at least some of said plurality of semantic objects, said at least one viewer being linkable to said sequence object for accessing said navigational path data whereby the said at least one viewer can follow said particular path and view the said semantic objects therealong.

With the present invention a user can elect to link his viewer to a specific sequence object and thus follow the path specified thereby, manipulating such or merely observing semantic objects as he may choose. This has application in training or in the provision of standard updating routines, for example.

Generally, the object world is a network in which the different semantic objects are nodes. The sequence object will carry details of the sequence of nodes to be followed. The path may be graphically represented on request.

Conveniently, provision is made for a user to skip or retrace steps in the path. Control may be implemented, for example, via a display of "PLAY"; "FAST FORWARD" and "REWIND" buttons.

The present invention can be regarded as an extension of a coupling facility, effectively providing coupling of a viewer with an automatic viewer constituted by the sequence object; however, it is also possible to implement the invention independently of any general coupling mechanism between viewers. Again, it is not mandatory that the viewer must follow the predetermined path. The user may choose to branch from the path or introduce loops. Such modifications may be recorded as a modified path for future use.

BRIEF DESCRIPTION OF THE DRAWINGS

The invention will further be described with reference to the accompanying drawings, of which.

DESCRIPTION OF THE PREFERRED EMBODIMENT

Figure 1:
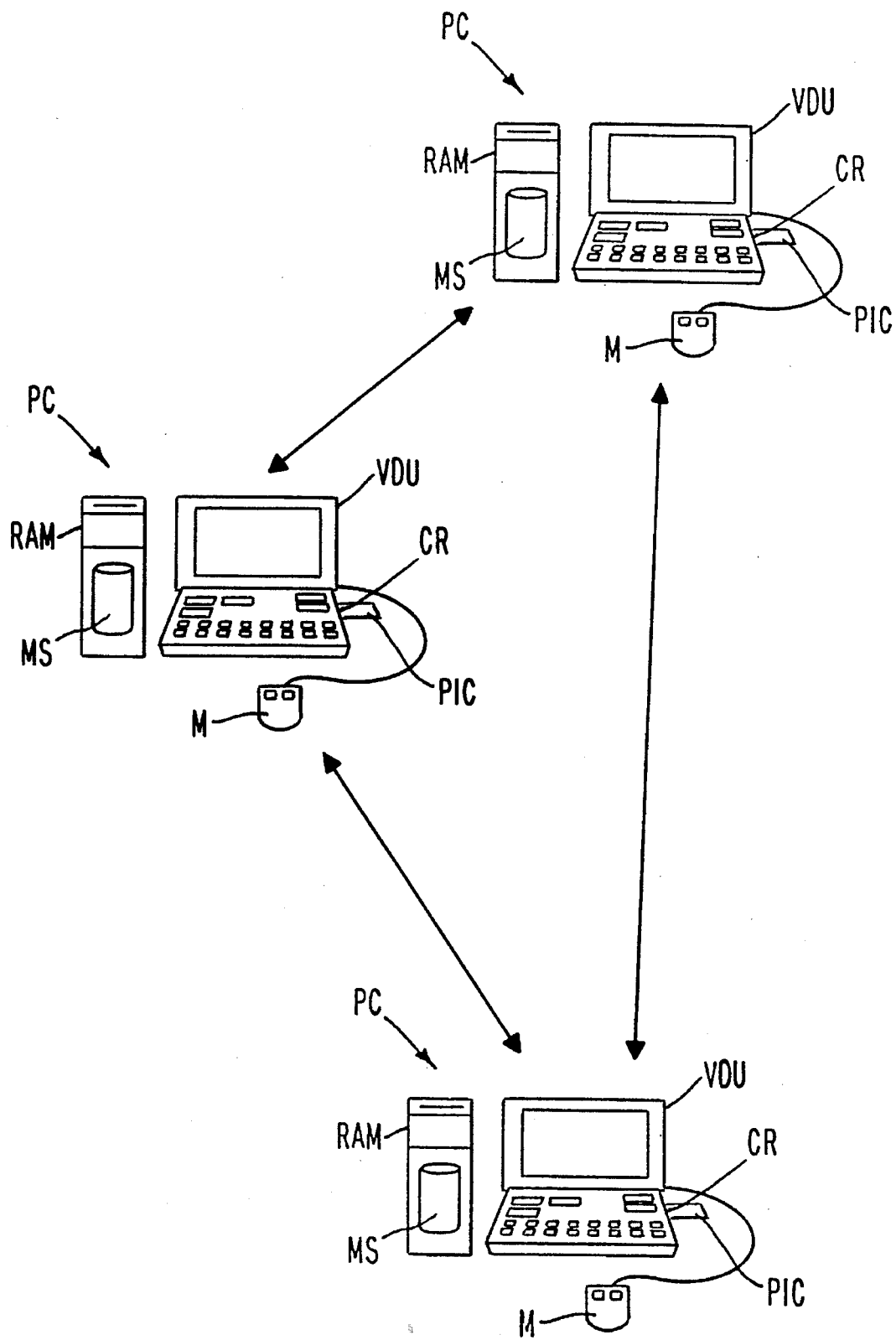
FIG. 1 is a schematic diagram of an object based computer system embodying the invention.

Referring to FIG. 1, there is shown an object based computer system which comprises a network of personal computers PC, each of which has a central processor unit CPU; random access memory RAM; mass storage facilities MS; a visual display unit VDU and a mouse M. In the drawing these units are designated for one computer only. Each computer also has a card reader CR.

The mass storage facilities MS constitute domains in the system which are generally associated with the user or users who habitually use that computer. Thus, objects associated with those users are stored there. These objects include, for example, the desktop objects for each habitually local user.

Figure 2:
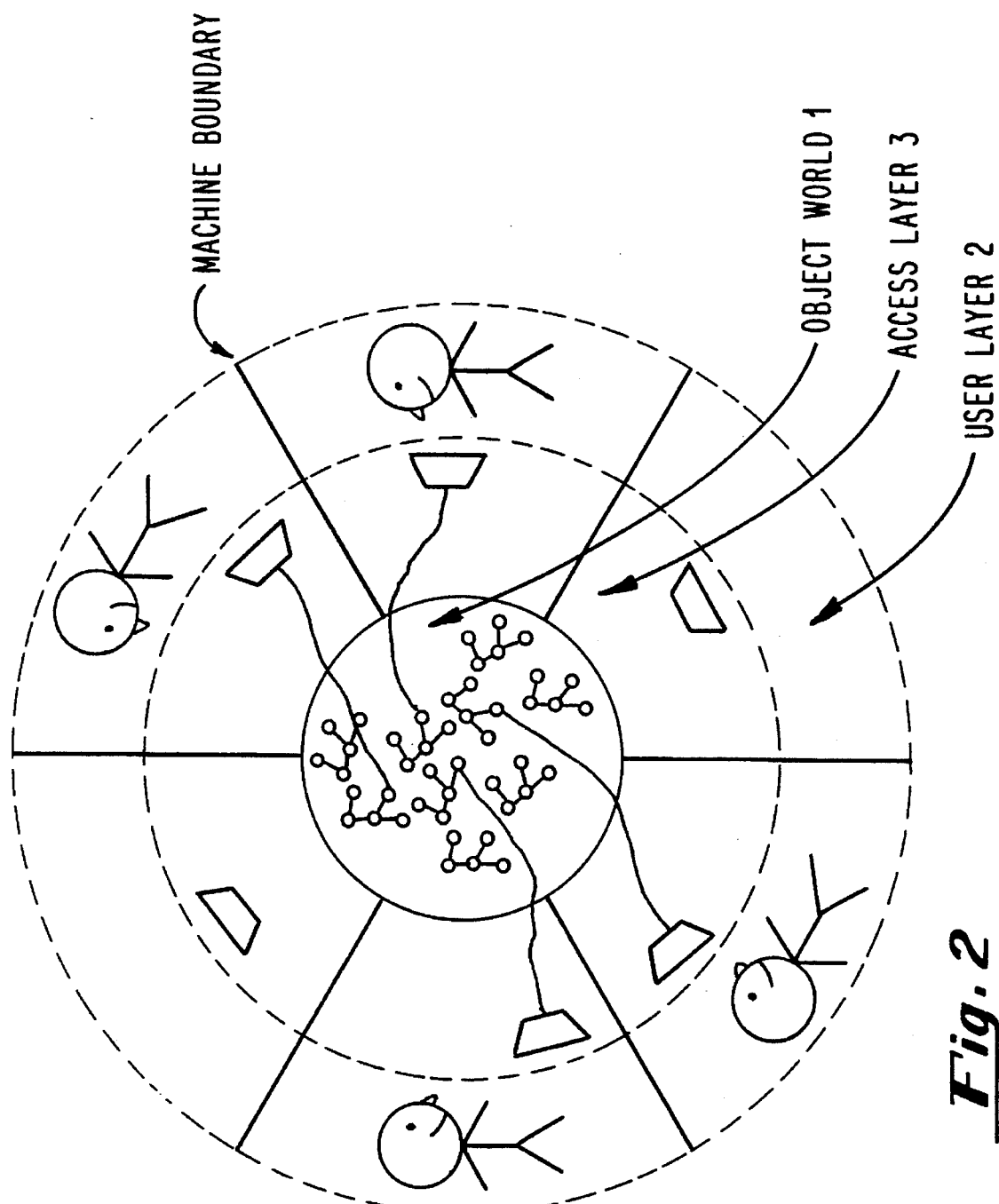
FIG. 2 is a diagram illustrating the user's model of a system which incorporates the invention.

Referring to FIG. 2 there is shown a model of a distributed office computer system which comprises several computers linked together in a network as in FIG. 1. Each computer has the usual input/output facilities of keyboard, mouse, and VDU as well as a CPU and hard disk on which are held object files. The core of the system is the object world 1 containing objects to which the users 2 have access.

Figure 3:
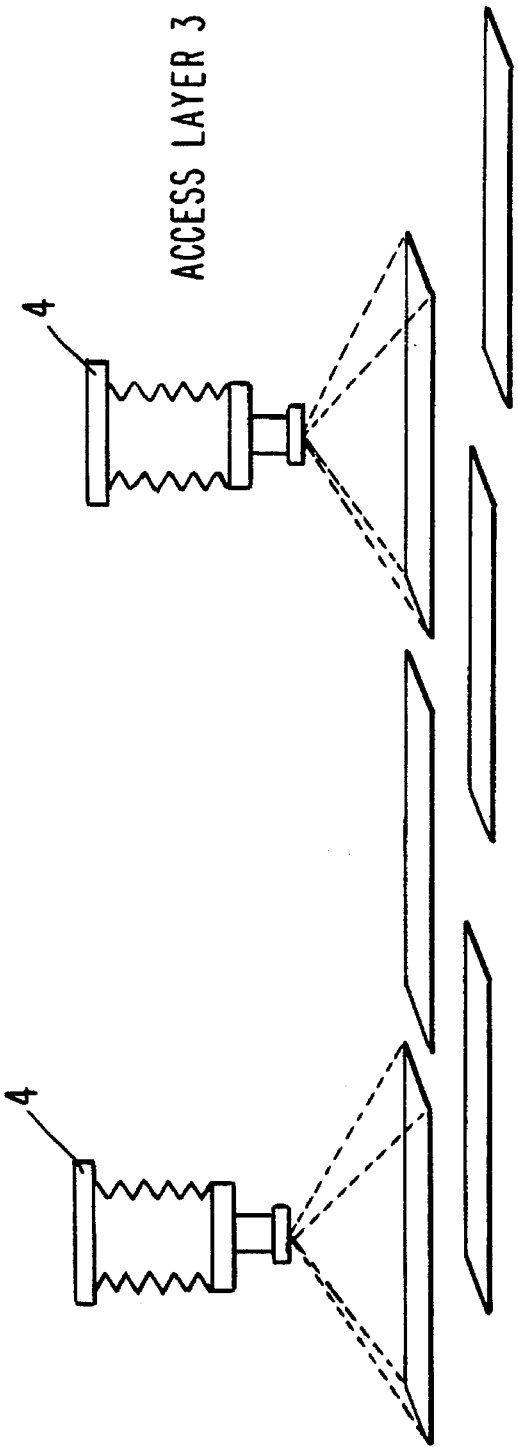
FIG. 3 is a further diagram illustrating part of the user's model of the system.

An important aspect of the system is the model of it which the user has. Critical in this is a layered structure which includes an access layer 3 whereby the users gain access to the objects in the object world 1. FIG. 3 shows more specifically the access layer 3 including viewers 4 which are window objects and which are able to be navigated to observe and preferably manipulate different objects in the object world. It is important to note the concept of navigation of a viewer between objects in this system. A user does not need to open a new window for each object. The viewers should be regarded as mechanisms in their own right.

Figure 4:
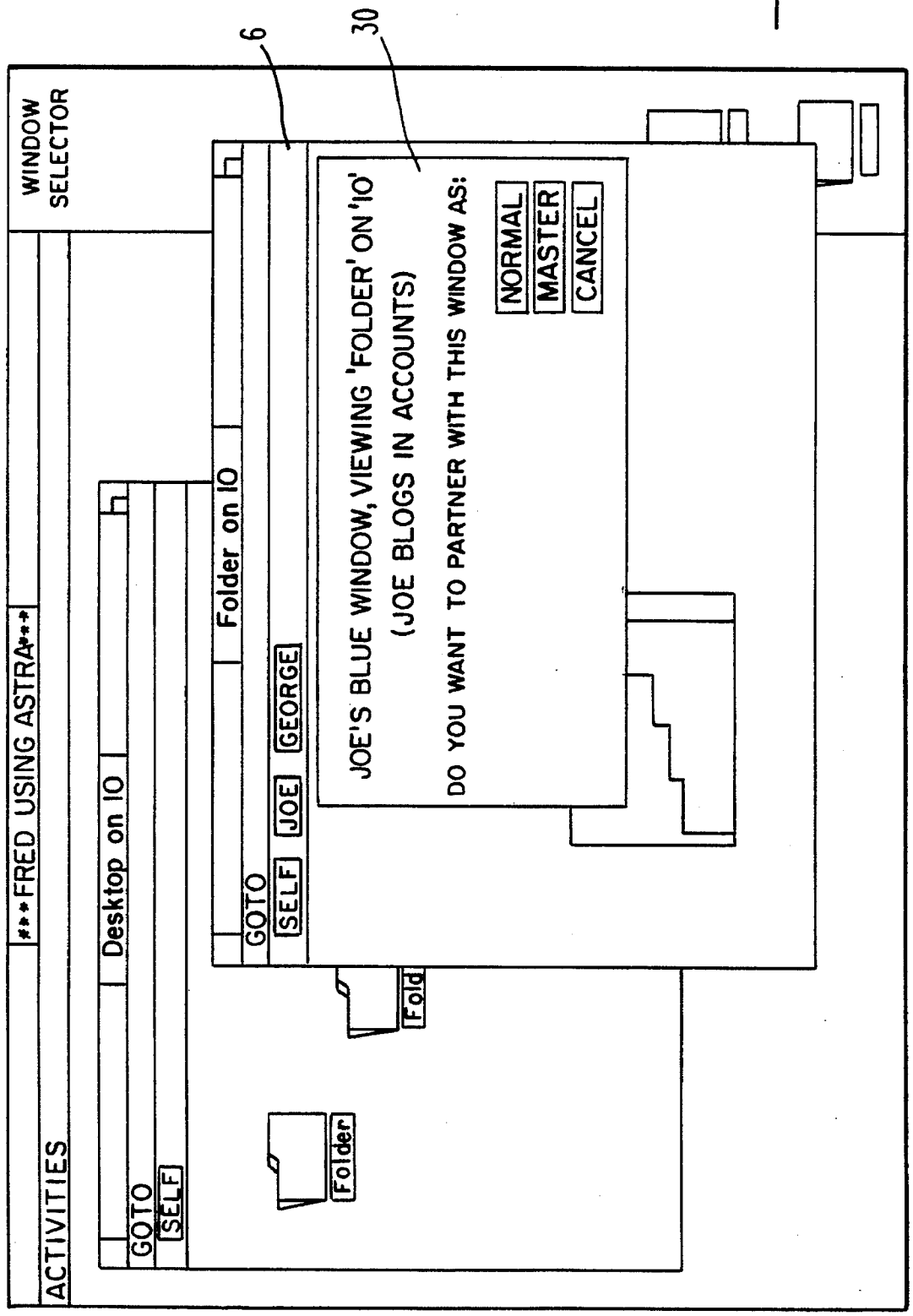
FIG. 4 is a diagram of a user's view of a system having a presence mechanism and a coupling mechanism.

A feature of the system is that multiple viewers may be concurrently access to the same object and each viewer has the capability to observe and preferably also manipulate the object. The nature of the association between a viewer and the object it is accessing is more than just having the object respond to messages sent to it by a viewer, the object being arranged to message the associated viewer of its own volition in order, for example, to communicate a change in the object effected through another viewer; to this end, each object maintains a list of viewers currently accessing the object. Of course, such an arrangement means that it is possible for a user to observe unexpected results. For example, icons might move or data might change. To facilitate an understanding of such effects the present system provides viewers with indications of concurrent viewers. This is shown in FIG. 4, where there is shown a presentation which has a first window which has been opened on "Desktop on IO" and a second window which has been opened on "Folder on IO". Both windows have presence bars 5 and 6 respectively. Bar 5 shows only one presence indication "self" which indicates that no other viewers are open on the object of that window. Bar 6, on the other hand, displays three presence indications showing that in addition to "self" there are the viewers of "Joe" and "George". What is immediately clear, therefore, is that users Joe and George will be viewing "Folder on IO". All three users will observe the same view of "Folder on IO" and will be able to manipulate that object. Each presence indicator is generally of "button" form and has a border of a particular colour corresponding to the viewer in question. The presence of the displaying viewer is always shown as the first in the list. The bar may be switched off by the user to conserve screen space. A more detailed description of the operation of the presence mechanism can be found in now abandoned U.S. application Ser. No. 08/084,562 (attorney docket no. HP389035A/HPF277), filed on even date herewith, the contents of which are herein incorporated by reference.

A coupling facility is provided for the sharing of expertise by means of coupling viewers. The fundamental concept needed for sharing is that of partnership. Two viewers can set themselves up as partners, which means no more than an agreement to pass each other information. Partnership is one to one agreement between two viewers, but a viewer may take part in several agreements. This is how many viewer sharing is achieved.

When a viewer adds another viewer as a partner, the viewer can send and receive a special set of messages which make up the partnership protocol. The messages embody viewer level operations, but are informative in nature, and are not of themselves commands. What prompts a viewer to send a message, and how a recipient responds are not predetermined. Thus, a viewer may send the message 'I have changed to look at object X', but there is no guarantee that the sender actually is looking at X, nor is there any guarantee that the recipient will itself go and look at X. It is important to understand that it is the viewers which determine how they interpret and react to the protocol. This is the basis of the partnership concept—an agreement to talk. The semantics of the dialogue are decided by the parties involved.

Thus, two viewers may set themselves up as partners, with the understanding that they will attempt to 'shadow' each other. In setting up this partnership, each viewer can be selectively set to operate either in a "normal" response mode in which it treats received navigational messages as commands and moves around the object world accordingly, or in a "master" response mode in which it treats received navigational messages as advisory only and either displays them or ignores them entirely (the latter option being preferred).

If a partnership between two viewers is set up on an equal, normal/normal basis (that is, both viewers operating in a "normal" mode) then the viewer receiving the navigational message 'I have changed to look at object X' from the other viewer will automatically move to look at X also. At this level we have the effect of sharing navigation.

It is easy to see how unequal, master/normal partnership (that is, one viewer operating in a "master" mode, the other in a "normal" mode) would give control to the 'master' viewer with the 'normal' viewer automatically following the latter but not vice versa.

Partnership on an equal, master/master, basis will allow the mutual transmission and display of navigational messages between the coupled viewers but neither viewer is forced to follow the other. In this way, if navigational messages are indeed displayed, either viewer can follow the other or diverge.

Note that the partnership agreements described work solely at the access layer level. If two partners are viewing the same object, then they can each access and manipulate that object to the same extent that they could if they were independent.

FIG. 4 shows the position where not only are the "SELF" and "JOE" viewers linked to the "Folder on IO" objects but also these two viewers are being coupled. The "SELF" viewer is displaying a menu which allows the user to select whether to partner the JOE viewer on (a) a 'normal' basis or (b) a 'master' basis (the third menu option, 'cancel', simply permitting the menu to be closed).

If 'normal' partnership is selected for SELF in partnering JOE, then incoming navigational messages to "SELF" from "JOE" are treated as commands so that the SELF viewer automatically follows the navigation of the JOE viewer around the object world. In this way the JOE user can guide the SELF user around the system. However, if partnership on a 'master' basis is selected for SELF in partnering JOE, then incoming navigational messages from JOE are not treated as commands and are either simply displayed (enabling optional following of JOE) or are ignored.

The present invention exploits the facility for coupling viewers to enable a viewer to follows a pre-stored path through the object world. This pre-stored path is held in a sequence object and a viewer wishing to follow the path associates itself with the sequence object to access the path (navigation) data stored therein and move in correspondence with this data through the object world from object to object. The nature of the association between the viewer and sequence object mimics a coupling relation between two viewers, with the viewer wishing to follow the stored path held by the sequence object receiving navigational messages from the latter and acting in a 'normal' coupling mode to move to the semantic object indicated by each received navigational message in turn.

Figure 5:
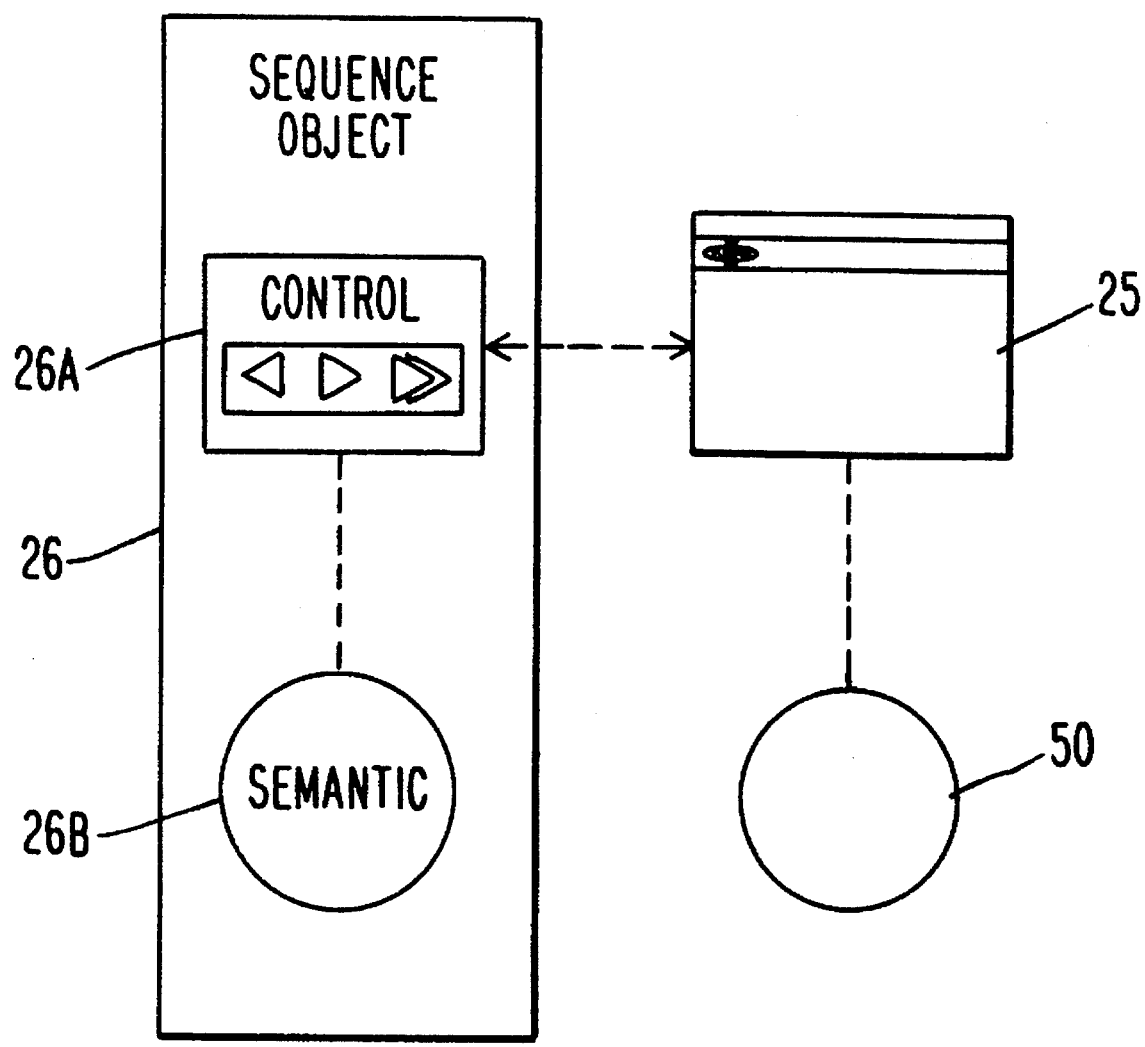
FIG. 5 is a schematic diagram of a user's view of the coupling of a sequence object to a viewer.

FIG. 5 illustrates how a sequence object 26 is arranged to permit it to adopt a coupling relationship with a viewer 25. More particularly, the sequence object 26 comprises a semantic part 26B containing navigational path data, and when the sequence object 26 is actively associated with a viewer, an additional presentation part 26A. This presentation part 26A acts as a pseudo viewer inasmuch as it is linked to the viewer 25 to implement the coupling relationship described above, the viewer 25 responding in a normal coupling mode to navigational messages passed to it by the pseudo viewer 26 to move to an indicated semantic object 50. The pseudo viewer 26A obtains its navigational data for passing on to viewer 25 from the semantic part 26B of the sequence object 26.

The pseudo viewer 26A also performs another important function, namely it provides a control panel interface by which the referee of viewer 25 can control progress through the path data held by the sequence object 26. To this end, the pseudo viewer 26A is actually displayed in its own window locally to the viewer 25, this display advantageously taking the form of a control panel, for example, such as illustrated in FIG. 5. For convenience, the pseudo viewer 26A (the presentation part of the sequence object 26) will hereinafter be referred to as the 'control panel' 26A, it being understood that the element referred to is more than just the visual representation of a control panel, and includes the underlying functionality described above in relation to the pseudo viewer.

Figure 6:
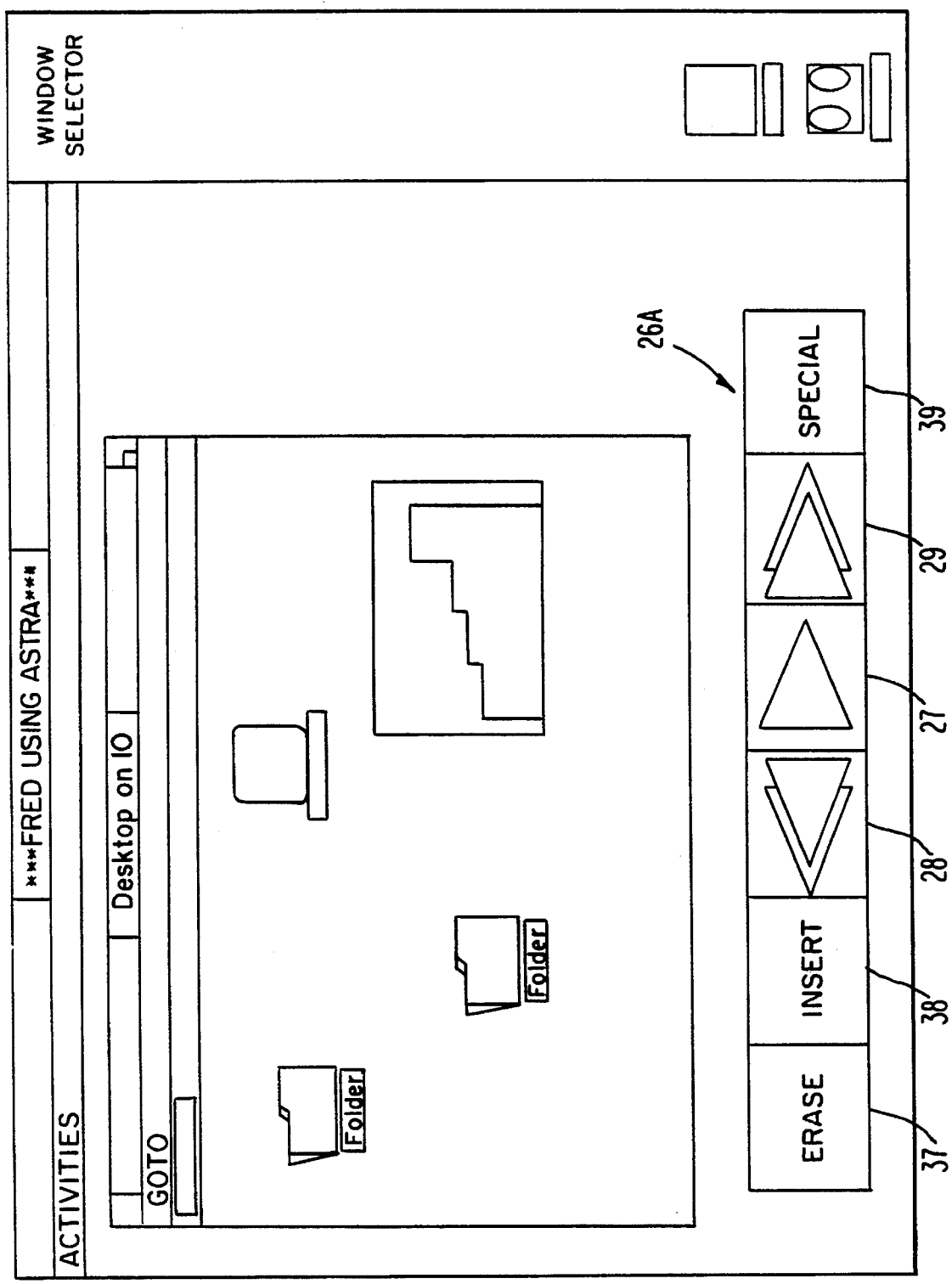
FIG. 6 is a diagram of a user's view of the system.

The control panel 26A shown in FIG. 6 displays "PLAY", "REWIND" and "FAST FORWARD" buttons 27, 28 and 29. By operating the mouse on these buttons the appropriate sequencing, back-stepping or skipping functions through the path data stored by the sequence object 26 can be achieved.

Operation of the control panel 26A is thus carried out in a manner analogous to operation of a tape player. Also provided are "ERASE"; "INSERT" and "SPECIAL" buttons 37, 38 and 39 whereby modifications may be made to the path data held by the sequence object.

Figure 7:
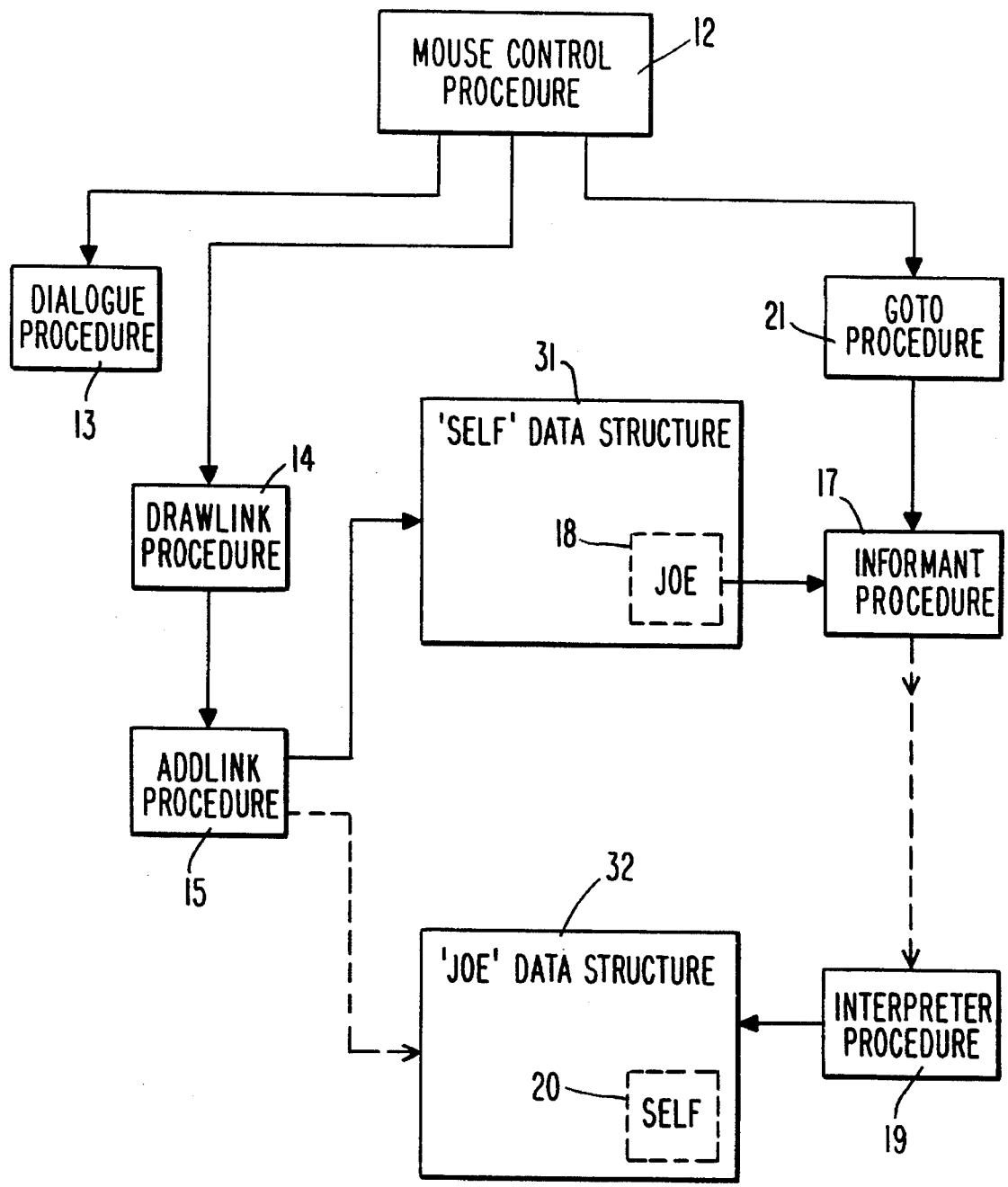
FIG. 7 is a schematic diagram illustrating program procedures in the coupling of two viewers.

Referring to FIG. 7 there is shown schematically the set of program procedures which allow the coupling facility to be effected. A procedure 12 is a mouse control procedure which monitors the movement of the mouse (and the resultant mouse cursor position) and the state of the mouse buttons. When the viewer shows a presence bar 6 as shown in FIG. 4 it is possible to establish a link with "JOE" or "GEORGE" by holding the mouse button down while the mouse cursor is over "SELF", dragging the mouse cursor to the "JOE" or "GEORGE" viewer button in the presence bar, and then releasing the mouse button (it is also possible to do this the other way around, for example, from "JOE" to "SELF"). This action initiates first a Drawlink procedure 14 to draw the chain 7 on the screen (FIG. 5), and then an Addlink procedure 15 to establish the appropriate data structures for linking the "SELF" viewer with the selected viewer (hereafter taken to be the "JOE" viewer).

More particularly, the Addlink procedure 15 records a new entry in a link data structure 31 associated with the "SELF" viewer, this data structure 31 being either created at the same time as the viewer or when the first link involving the viewer is established. Each entry in the data structure 31 records details of the identity of the selected viewer (in this case, an entry 18 is made for "JOE"). The Addlink procedure 15 also messages the selected viewer "JOE" (generally on a different computer PC) and this results in an entry 20 being made in the corresponding link data structure 32 associated with the "JOE" viewer; the entry 20 identifies the "SELF" viewer as a viewer linked to "JOE".

As described above, coupling of viewers is effected when they rendezvous to view a common object. The presence mechanism is effective to ensure that the object being viewed has a table of the viewers which are viewing it, this table containing appropriate information enabling links to be established.

Upon establishment of a link between the "SELF" and "JOE" viewers, the default response mode of the "SELF" viewer in respect of navigational messages received from "JOE" is the "normal" mode, that is, the "SELF" viewer will seek to follow "JOE". To vary this operation, the mouse cursor is placed on the viewer button for "JOE" and the mouse button clicked whilst the keyboard 'control' key is held down—this causes procedure 12 to respond by calling a dialogue procedure 13. The procedure 13 displays the dialogue box 30 shown in FIG. 4. It is then possible to click the mouse on "NORMAL", "MASTER" or "CANCEL"; the selected mode is recorded in the relevant entry 18 of the "SELF" data structure 31 or, if the "CANCEL" option is chosen, the menu is closed.

To undo a coupling link, the mouse cursor is placed on the relevant viewer button (e.g. "JOE") and the mouse button clicked. The link between SELF and JOE is then destroyed with the entry 18 being deleted and a corresponding message being sent to the "JOE" viewer to enable it to remove the "SELF" entry 20 from the data structure 32.

It will be appreciated that the command strokes (keyboard and/or mouse operation) used to initiate any action are selected simply for convenience and can be varied from what is described herein.

The foregoing arrangement for specifying the "normal/master" mode of response of the "SELF" viewer to navigational messages received thereby from linked viewers, permits the response mode to be selectively set for each said link. However, where the "SELF" viewer is coupled to more than one other viewer, conflicts could arise as to which viewer to follow if the "normal" response mode is set for more than one link; although this possibility has not proved to be a problem in practice, it may in some situations be desirable to arrange for the "SELF" viewer only to respond in its "normal" mode to messages from one of the coupled viewers. Furthermore, for simplicity, it may be preferable to arrange for the "SELF" viewer to be in the same mode for every link in which it is involved (rather than permit different modes for different links) so that if the "SELF" viewer is set in its "normal" mode, only one link can be established whilst if it is in its "master" mode, many links may be established. With this arrangement, the mode could be set before any link was established by causing a click on the "SELF" indicator button to initiate procedure 13. Implementations of the above arrangement will be apparent to persons skilled in the art.

When viewers are coupled, if the user of the "SELF" viewer elects to view another object a GOTO procedure 21 calls an informant procedure 17 with a message and this latter procedure identifies, from the data structure 31, all the viewers coupled to the "SELF" and sends information to them via an IWentToMessage. At each messaged viewer, an interpreter procedure 19 interprets such messages received from other viewers and acts according to the response mode in effect. If the receiving viewer is 'master' it either displays or ignores the IWentToMessage. If the receiving viewer is normal, tests are made by procedure 19 to determined whether the viewer is already viewing the object and if not a GOTO instruction is issued to cause the receiving viewer to follow the sending viewer.

Figure 8:
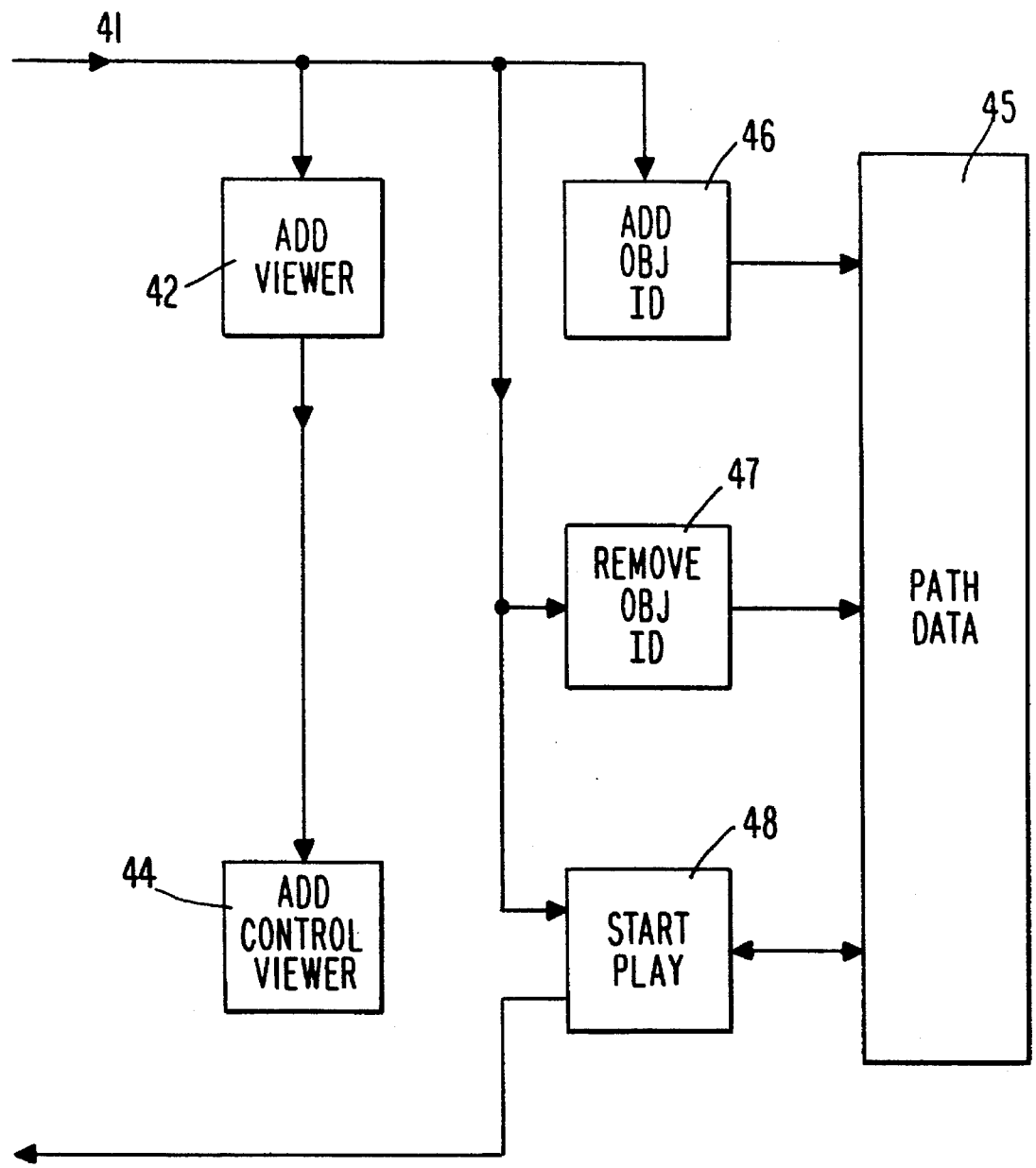
FIG. 8 is a schematic diagram of program procedures associated with a sequence object.

Referring to FIG. 8 there is shown schematically a set of program procedures associated with a sequence object. A user operating a viewer has the option to choose to "view" a sequence object. If that option is chosen the viewer sends a message to the sequence object (in fact to the semantic part 26B of the sequence object, the control panel part 26A not being yet in existence). This message is received by the sequence object at 41 and invokes an AddViewer procedure 42 by which the sequence object registers the viewer in its list of linked viewers.

Next, the procedure 44 'AddControlViewer' is initiated for generating the pseudo-viewer control panel 26B. To do this, procedure 44 sends a message back to the viewer the effect of which is to cause the viewer to recover appropriate program code for generating the control panel 26B and displaying it in local association with the viewer, the control panel being displayed at a location determined by the local window manager. The program code generating the control panel 26B also causes the control panel 26A to establish both a link with the semantic part 26B of the corresponding sequence object and a coupling mode link to the viewer (the control panel 26A being, of course, provided with the appropriate procedures and data structures for recording and operating these links in the manner generally described above).

Once the control panel 26A has been created, the control panel will access an initial object world position stored in the sequence object part 26B and pass this position in a navigational message to the viewer. The viewer responds to this message in a normal coupling mode and will move to the indicated semantic object of the object world. Although the viewer is now no longer viewing the sequence object part 26B, the latter does of course retain a record of the fact that the viewer is still associated with it (through the intermediary of the control panel 26A).

The referee of the viewer may now move along the path stored in the sequence object 26 by appropriate operation of the control panel 26A. In this respect it is noted that the mouse control procedure (shown at 12 in FIG. 7) associated with the machine displaying the viewer and control panel is effective to recognise mouse operation of the control panel displayed representation to pass appropriate messages to the control panel 26A itself for the initiation of appropriate action (for example, fetching new path data from the sequence object part 26B.

The path data 45 stored by the sequence object part 26B may, for example, be a simple list of semantic objects identified by unique object identifiers or node addresses in the system data structure. The path data 45 can be created by linking a viewer to the sequence object in the manner described above and then navigating the viewer around the object world in a required path or sequence (note that the linking of a viewer to a sequence object does not prevent independent navigation of the viewer). If a particular object being viewed is to be included in the path then the "insert" button 38 (FIG. 6) is clicked by the mouse. If an object is to be removed from the sequence then the "erase" button 37 (FIG. 6) is clicked when the object is being viewed. These actions invoke, via the control panel part 26A, the procedures "AddObjId" 46 and "RemoveObjId" 47 respectively of the sequence object part 26B.

If the "Play" button 27 (FIG. 6) is clicked then the sequence of objects in path data 45 is followed and viewed either on a step-by-step basis or at a predetermined speed (this can be a design choice or a user choice). A "StartPlaying" procedure 48 is invoked to move through the path data and this has the effect of passing navigational data from the path list to the control panel which then passes navigational coupling messages on to the user's viewer, indicating "IWentToObjId" for the respective objects in the path data 45 in turn. Again the user will generally have the facility to break away and pursue his own path. The "STOP" and "PLAY" buttons of the control panel may be used in a manner which will readily be understood. The "FAST FORWARD" and "REWIND" buttons are effective to play at an increased object stepping rate, forwards and in reverse respectively.

The path data 45 need not be restricted to a simple list but may constitute a directed graph with the user being presented on the control panel display with choice buttons for enabling the user to indicate, at appropriate locations in the directed graph, which of several possible paths is to be followed.

Any suitable command stroke or stroke combination can be used to enable a user to indicate that the link to the sequence object is to be broken. In this event, the control panel 26A will be destroyed and the viewer removed from the list of linked viewers held by the sequence object semantic part 26B.

Various modifications and variations on the above-described sequence object mechanism will be apparent to persons skilled in the art. Thus, the messages sent from the sequence object to the linked viewer need not necessarily be of the same form as the navigational messages passed between viewers linked by the coupling mechanism; it is entirely feasible to use different message types and to provide the viewers with response procedures specific to the messages from the sequence object. Such an arrangement is not, however, preferred.

It will be appreciated that the object-oriented environment in which the invention is employed may differ in detail from that described above. For example, the sequence object mechanism can usefully be employed not only in systems where access to an object through a viewer permits both viewing and manipulation of the object but also in systems where only viewing is possible. Again, the environment may not be one conventionally thought of as a "windowing" one in the sense that multiple windows can be simultaneously viewed—all that is required for implementation of the invention is that a plurality of viewers should be provide respective windows onto an object, even though each viewer may be physically associated with a display device such that only that viewer can be displayed. It will also be appreciated that although reference has been made to a mouse for effecting user selection via the VDU, the use of other pointing devices such as tracker balls and graphic tablets is also possible.

It will further to appreciated that the details of the management of the object world may vary from that described. In particular, in certain systems all objects may be simultaneously active so that there is no need for the object manager to effect activation of objects.

We claim:

1. An object based computer system comprising:
   at least one computer programmed to support objects; and
   a plurality of objects associated with said at least one computer, said plurality of objects comprising:
      a plurality of semantic objects;
      at least one viewer, the at least one viewer linked to one of the plurality of semantic objects; and
      a sequence object having a stored navigational path data, the navigational path data being a temporal ordered listing of at least one of the semantic objects of the plurality of semantic objects, the sequence object linked to the at least one viewer to provide the navigational path data in a controlled manner to the at least one viewer so that the at least one viewer can navigate along a particular path, the temporal ordered listing of the at least one of the semantic objects of the plurality of semantic objects which comprise the navigational path data of the sequence object so that the at least one viewer can follow the particular path and view the at least one semantic object therealong.

2. An object based computer system as claimed in claim 1, wherein there are a plurality of viewers and the system further comprises navigational coupling means for coupling one of the plurality of viewers together with another of the plurality of viewers in a set to pass a navigational message generated by the one of the plurality of viewers to the another of the plurality of viewers in the set in order to lead the another of the plurality of viewers around the plurality of said objects based on the navigational message, the at least one semantic data object of the plurality of semantic objects of the navigational path data of the sequence object being linked the one of the plurality of viewers to lead the one of the plurality of viewers around the path formed by the at least one semantic data object of the plurality of semantic objects and thereby the another of the plurality of viewers receiving the navigational message passed by the one of the plurality of viewers based on the navigational data path of the sequence object.

3. An object based computer system as claimed in claim 2, wherein said sequence object comprises a semantic part holding said navigational path data, and at least when said sequence object is linked to a said viewer, a pseudo-viewer part coupled by said coupling means to said viewer linked to the sequence object, said pseudo-viewer part passing navigational messages to the said viewer in correspondence to the path data held by the said semantic part.

4. An object based computer system as claimed in claim 3, wherein said pseudo-viewer includes a control panel representation displayed in association with the said viewer linked to the said sequence object.

5. An object based computer system as claimed in claim 1, further comprising means for generating a control panel representation upon a said viewer seeking to link with said sequence object, said representation being displayed in association with said viewer.

6. An object based computer system as claimed in claim 4, wherein said control panel representation includes representations for first, second and third buttons and wherein said system includes pointing device means for selecting a said button and generating a corresponding control message to be passed to said sequence object, said sequence object being responsive to the said control message generated by selection of the said first, second and third buttons respectively to advance through said navigational path data at a first speed, to advance through said path data at a second speed greater than said first speed, and to move backwards through said path data.

7. An object based computer system as claimed in claim 4, wherein said control panel representation includes representations for delete and insert buttons and wherein said system includes pointing device means for selecting a said button and generating a corresponding control message to be passed to said sequence object, said sequence object being responsive to the said control message generated by selection of the said delete button to delete from its said path data information pertaining to the identity of the current said semantic object being viewed by the said viewer associated with said control panel representation and said sequence object being responsive to the said control message generated by selection of the said insert button to insert into its said path data information pertaining to the identity of the current said semantic object being viewed by the said viewer associated with the said control panel representation is overlaid.

8. An object based computer system as claimed in claim 1, wherein the path data is in the form of node addresses of the said semantic objects to be viewed.

9. An object based computer system as claimed in claim 5, wherein said control panel representation includes representations for first, second and third buttons and wherein said system includes pointing device means for selecting a said button and generating a corresponding control message to be passed to said sequence object, said sequence object being responsive to the said control message generated by selection of the said first, second and third buttons respectively to advance through said navigational path data at a first speed, to advance through said path data at a second speed greater than said first speed, and to move backwards through said path data.

10. An object based computer system as claimed in claim 5, wherein said control panel representation includes representations for delete and insert buttons and wherein said system includes pointing device means for selecting a said button and generating a corresponding control message to be passed to said sequence object, said sequence object being responsive to the said control message generated by selection of the said delete button to delete from its said path data information pertaining to the identity of the current said semantic object being viewed by the said viewer associated with said control panel representation and said sequence object being responsive to the said control message generated by selection of the said insert button to insert into its said path data information pertaining to the identity of the current said semantic object being viewed by the said viewer associated with the said control panel representation is overlaid.

* * * * *